No. 763,491.                                                         Patented June 28, 1904.

UNITED STATES PATENT OFFICE.

HERMANN VON KÉLER, OF LEVERKUSEN, NEAR COLOGNE, GERMANY, ASSIGNOR TO FARBENFABRIKEN OF ELBERFELD CO., OF NEW YORK, N. Y., A CORPORATION OF NEW YORK.

PROCESS OF MAKING NITROUS ANHYDRID AND NITRITES.

SPECIFICATION forming part of Letters Patent No. 763,491, dated June 28, 1904.

Application filed July 16, 1903. Serial No. 165,838. (No specimens.)

*To all whom it may concern:*

Be it known that I, HERMANN VON KÉLER, residing at Leverkusen, near Cologne, Germany, (assignor to the FARBENFABRIKEN OF ELBERFELD COMPANY, of New York,) have invented a new and useful Improvement in Processes of Making Nitrous Anhydrid and Nitrites; and I hereby declare the following to be a clear and exact description of my invention.

My invention relates to a new and valuable process for the production of nitrous anhydrid and nitrites.

This process consists in passing a mixture of ammonia with an excess of oxygen or atmospheric air over oxids of heavy metals—such as iron oxid, copper oxid, mixtures of these oxids, or the like—which bodies are heated to about from 650° to 750° centigrade. It is practical to employ as metal oxids desulfureted burnt pyrites, which, as is known, consists for the most part of iron oxid and a small quantity of copper oxid. For the production of nitrites the resulting nitrous anhydrid is allowed to act on alkalies or alkaline carbonates, or the like.

In carrying out my invention I place ferric oxid in a proper receptacle and heat it to about 700° centigrade. I then pass a mixture of ammonia with air (containing two to three volumes of ammonia) through this receptacle, the temperature in the interior being kept at about 700° centigrade during the whole operation. A continuous flow of nitrous anhydrid is thus obtained, which is then conveyed through a suitable condenser in order to separate therefrom water and small quantities of by-products. On introducing the nitrous anhydrid thus obtained into a solution of caustic soda, sodium, carbonate, or the like or conducting the gas over oxids or carbonates the respective nitrites are obtained.

It is obvious that other oxids of heavy metals or mixtures of these bodies may also be substituted for iron oxid.

Having now described my invention, what I claim as new, and desire to secure by Letters Patent, is—

1. The new process for the production of nitrous anhydrid, which process consists in passing a mixture of ammonia with an excess of oxygen over an oxid of a heavy metal at a temperature higher than 650° centigrade and lower than 750° centigrade, substantially as hereinbefore described.

2. The new process for the production of nitrous anhydrid, which process consists in passing a mixture of ammonia with an excess of air over an oxid of a heavy metal at a temperature higher than 650° and lower than 750° centigrade, substantially as hereinbefore described.

3. The new process for the production of nitrous anhydrid, which process consists in passing a mixture of ammonia with an excess of air over a mixture of oxids of heavy metals at a temperature higher than 650° centigrade and lower than 750° centigrade, substantially as hereinbefore described.

4. The new process for the production of nitrites, which process consists in first passing a mixture of ammonia with air and containing two to three volumes of ammonia over iron oxid heated to between 650° and 750° centigrade and then allowing the nitrous anhydrid thus obtained to act on alkali hydroxids, alkaline carbonates, and the like, substantially as hereinbefore described.

In testimony whereof I have signed my name in the presence of two subscribing witnesses.

HERMANN VON KÉLER.

Witnesses:
    OTTO KÖNIG,
    J. A. RITTERSHAUS.